July 18, 1939.　　　　M. E. DAYTON　　　　2,166,208
COUPLER
Filed Nov. 30, 1936
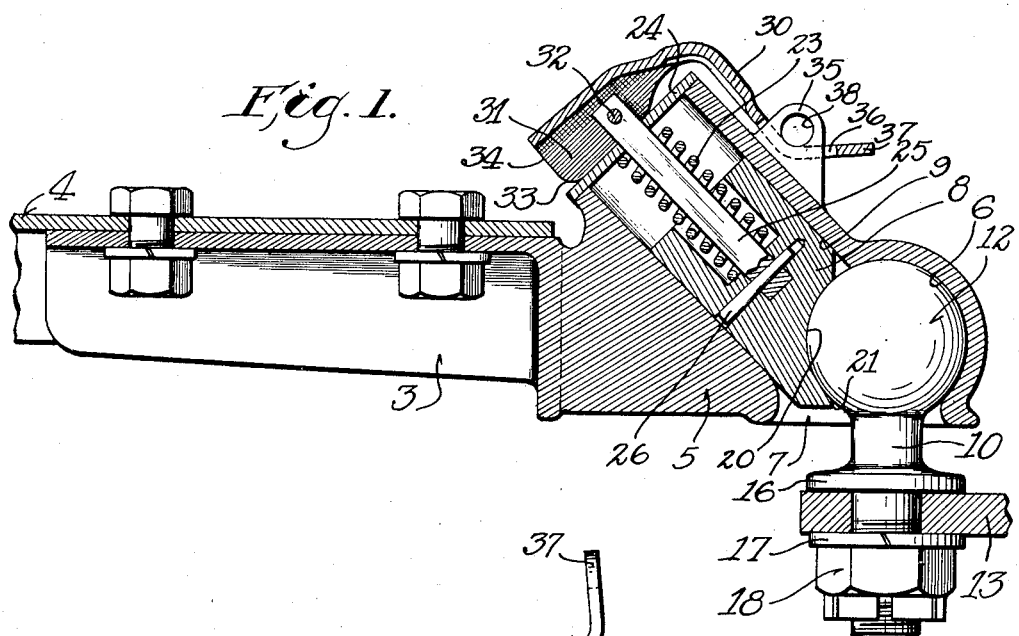
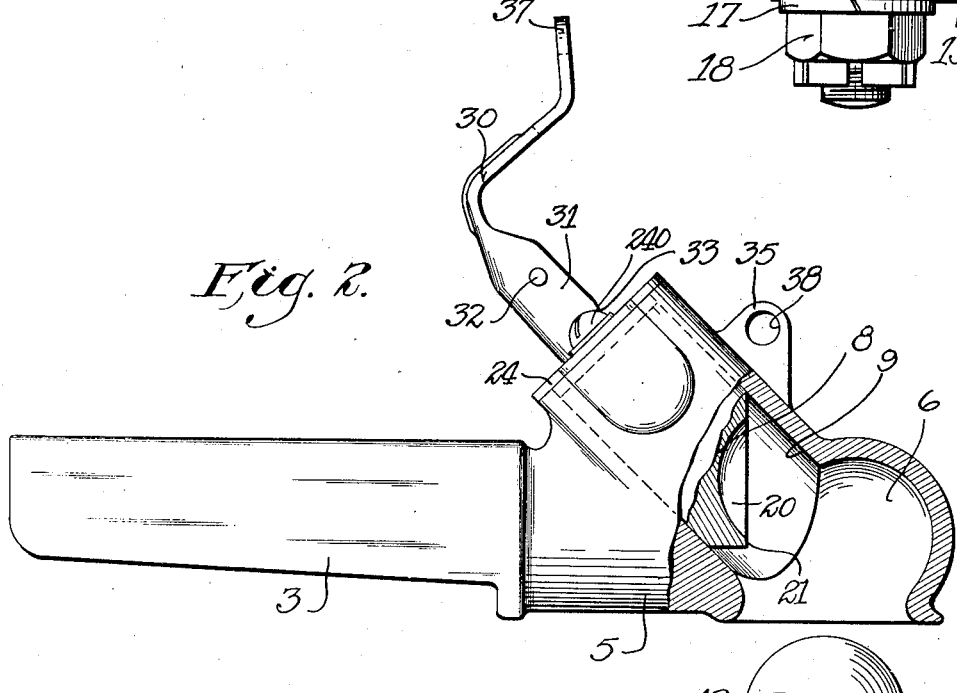
Inventor
Max E. Dayton
By Wheeler, Wheeler & Wheeler Attorneys Patented July 18, 1939

2,166,208

UNITED STATES PATENT OFFICE 2,166,208

COUPLER

Max E. Dayton, Rockford, Ill., assignor of one-half to Bay St. John, Rockford, Ill.

Application November 30, 1936, Serial No. 113,307

8 Claims. (Cl. 280—33.15)

This invention relates to improvements in couplers. The present application is a companion to my application Serial No. 745,087 filed September 22, 1934, and entitled Trailer hitches.

It is the object of the present invention to provide a handle having a camming action for the withdrawal of the bolt which latches the coupler ball from accidental release from its socket. It is my further purpose to provide a handle which may have the character of a hasp with which a lock is engageable to prevent any unauthorized disengagement of the coupler without in any way precluding the automatic retraction of the bolt under pressure in coupler engagement when the device is unlocked.

Other objects of the invention relate to specific details of my improved manipulating device including a construction in which a handle will tend to maintain itself in a bolt retracting position until released by the operator.

In the drawing:

Fig. 1 is a longitudinal section through a coupler embodying the invention.

Fig. 2 is a view partially in side elevation and partially in longitudinal section showing the handle manipulated to a position in which the latching bolt is retracted.

Like parts are identified by the same reference characters throughout the several views.

As in the device disclosed in the companion case above referred to, there is a shank at 3 adapted for connection to the trailer tongue 4. This shank carries a head 5 providing a socket 6 opening downwardly through the mouth 7 which is normally restricted by a plunger 8 slidable in bore 9 at an angle of about 45° to the neck portion 10 of the ball 12.

The ball 12 is mounted by means of threads upon its neck 10 to a bracket 13 attached to a towing vehicle. A collar 16 engages the upper surface of the bracket, and the lower surface thereof is engaged by a lock washer 17 under the compression of a nut 18.

The plunger 8 is preferably provided at 20 with a pocket complementary to the spherical contour of the socket 6. The lower margin 21 of the plunger is adapted to extend well around the under surface of ball 12 toward the neck 10. Obviously any tension between those portions of the coupler attached to the trailer and those portions attached to the coupling device will, by reason of the angle of bore 9, tend to draw the latching bolt or plunger 8 downwardly into more intimate pressure engagement with the ball 12 instead of exerting a wedging action tending to force the plunger 8 to retracted position, as would be the case if the bore 9 were more nearly horizontal.

At the same time the angle of bore 9 is such that for engagement of the ball in its socket a relatively slight downward pressure of the socket relative to the ball will enable the ball to force the latching plunger or bolt 8 outwardly in its bore 9 to permit the ball to enter the socket. As soon as the ball has entered the socket the latching bolt or plunger will be urged downwardly by gravity and by spring 23 to seat behind the ball to preclude its accidental egress from the socket. Spring 23 seats against a removable closure plate 24 which is applied across the top of bore 9 and is normally held in place by screws, one of which is shown at 240.

The compression spring 23 is guided by a stem 25 which may be secured within the plunger in any desired manner, but is preferably anchored by transversely disposed taper pin 26.

Since the compression spring 23 is usually confined under substantial pressure, the operation of manually retracting the latching bolt or plunger 8 to permit the withdrawal of ball 12 from socket 6 is greatly facilitated by the provision of a handle which functions with a camming action. Such a handle is shown at 30. It is deeply channeled by the provision of handle flanges 31 which are engaged over the end of stem 25 and pivotally connected therewith by means of a transverse pintle 32. The flanges 31 have rounded heel portions 33 in thrust bearing engagement with the upper surface of plate 24. The ends 34 of the flanges are flat, and preferably are intersected by a line drawn at right angles to such surfaces through the pin 32.

Beyond the margin of bore 9, handle 30 is preferably bent at right angles and carried downwardly along the top surface of the head casting 5 where it is engaged over an ear 35 formed integrally with the head casting and received into a slot 36 in the upwardly formed end 37 of the handle. An aperture 38 in ear 35 is adapted to receive an ordinary padlock by means of which the handle 30 may be locked into the position in which it is shown in Fig. 1 to prevent the unauthorized retraction of stem 25 and the latching bolt or plunger 8. In other words, the coupler may be locked in assembled relation to prevent anyone from detaching a trailer from its towing vehicle.

With the padlock removed from hole 23 it is, however, an easy matter for the operator to grasp the elevated end 37 of the handle lever 30 to oscillate the handle about pin 32, whereby the flat margins of the handle flanges 31 will operate with a camming action upon the upper surface of plate 24 to retract the stem 25 and the latch bolt or plunger 8, and thereby to release the engagement of the plunger with ball 12. In the extreme upper position of handle 30 (which is illustrated in Fig. 2) the flat end surfaces 34 of flanges 31 will be engaged with the top of plate 24, and the pressure of the compression spring 23 on stem 25 will be transmitted through pin 32 upon a line passing vertically across surfaces 34 to the top of plate 24. Obviously the parts will be entirely stable in this position of adjustment, and the operator may release the handle 30 to manipulate the tongue of the trailer and thereby to lift the coupler head 5 from ball 12. As shown in Fig. 2, the ball will pass freely from the socket when the plunger or latch bolt 8 is thus retracted.

The line of thrust exerted on pintle 32 in the Fig. 2 position of the parts, passes so close to the rounded heel portions 33 of flanges 31, however, that very little is required to dislodge the handle from its retracted position. If the coupler be re-engaged by dropping head 5 sharply upon the supporting ball 12, the impact and the inertia of the projecting end portion 37 of the handle lever will ordinarily be sufficient to dislodge the handle from its elevated position and to permit the compression spring 23 to snap the plunger home around the ball.

If, on the other hand, the handle has already been released from its Fig. 2 position and allowed to assume its Fig. 1 position before re-engaging the coupler, it is important to note that this engagement of the handle over the ear 35 does not preclude the entrance of the ball into the coupler in the manner already described. The pressure of the ball on the lower end of the plunger or latch bolt 8 (ordinarily the mere weight of the trailer tongue and the fitting 5 is adequate) will force the plunger to its retracted position and permit the ball to enter the socket, following which the plunger will again snap home behind the ball and will remain in its latching position until released manually by the operator's manipulation of the handle.

I claim:

1. In a coupler, the combination with a coupler and head providing a socket having a ball receiving opening, of a latching plunger reciprocable to and from a position wherein said opening is restricted by said plunger, a spring urging said plunger to said position, and plunger retracting means comprising a handle operatively connected to the plunger, and means for locking said handle to said head against the retraction of said plunger.

2. In a coupler, the combination with a coupler head provided with a ball receiving socket and an opening leading thereto, of a plunger movable with respect to said head to and from a position in which said opening is restricted, a spring urging said plunger toward said position, a combination handle and hasp movable with respect to said head, means with which said hasp is engageable for the locking of said hasp to said head, and means pivotally connecting said hasp with said plunger for the manipulation of said plunger when said hasp is not locked.

3. In a coupler, the combination with a coupler head, of a latching bolt, a spring urging said bolt to operative latching position, said head having a bore in which said bolt is retracted from said position, a closure for said bore, and a handle provided with cam surfaces operating against said closure for the retraction of said bolt in said bore, said handle being in pivotal connection with said bolt.

4. In a coupler, the combination with a coupling head having a ball receiving socket and an opening leading therefrom and a bore leading toward said socket, of a plunger reciprocable in said bore to and from a position in which it restricts the opening, a closure for the end of said bore provided with an opening, a stem connected with the plunger and projecting through the opening, a compression spring confined between the closure and the plunger and arranged to urge the plunger toward said position, and a handle channeled to receive said stem and provided with a pintle pivotally connecting the handle with the stem, the handle having a cam surface engaged with said closure and of such a form as to effect the retraction of said plunger upon the oscillation of said handle about said pintle.

5. In a coupler, the combination with a coupling head having a ball receiving socket and an opening leading therefrom and a bore leading toward said socket, of a plunger reciprocable in said bore to and from a position in which it restricts the opening, a closure for the end of said bore provided with an opening, a stem connected with the plunger and projecting through the opening, a compression spring confined between the closure and the plunger and arranged to urge the plunger toward said position, and a handle channeled to receive said stem and provided with a pintle pivotally connecting the handle with the stem, the handle having a cam surface engaged with said closure and of such a form as to effect the retraction of said plunger upon the oscillation of said handle about said pintle, said handle having a lever portion bent at an angle to extend along the upper surface of said head and to project laterally when said handle is adjusted to its plunger retracting position.

6. In a coupler, the combination with a coupling head having a ball receiving socket and an opening leading therefrom and a bore leading toward said socket, of a plunger reciprocable in said bore to and from a position in which it restricts the opening, a closure for the end of said bore provided with an opening, a stem connected with the plunger and projecting through the opening, a compression spring confined between the closure and the plunger and arranged to urge the plunger toward said position, and a handle channeled to receive said stem and provided with a pintle pivotally connecting the handle with the stem, the handle having a cam surface engaged with said closure and of such a form as to effect the retraction of said plunger upon the oscillation of said handle about said pintle, said handle having a hasp lever provided with a slot, and said member having an apertured ear receivable in the slot when said handle is adjusted to a point such that said plunger is extended to the aforesaid position.

7. A coupler comprising the combination with a coupling head and a detachable bolt movable to and from an advanced coupling position, of a compression spring urging said bolt toward said position, a handle comprising a lever for the manipulation of said bolt and provided with a cam surface including a rounded heel and terminating in a substantially flat margin, means including a pintle connecting said handle with said bolt, said flat margin and rounded heel being so disposed that in the handle position corresponding to the retracted position of said bolt the line of thrust of said spring on said pintle will extend close to said rounded margin, whereby said handle may readily be dislodged to permit said spring to act for forcing said bolt to said advanced position.

8. In a coupler, the combination with a coupling head and a latching bolt movable between advanced and retracted positions with respect to said head, of a spring urging said bolt to its advanced position, a stem connected with said bolt, a hand lever for manipulating said bolt to its retracted position, and a pintle connecting said hand lever with said stem, said hand lever having side flanges providing a channel engaged over said stem, the margins of said flanges constituting cam surfaces having a rounded heel portion and a substantially flat terminal margin, and said head being provided with means against which said cam surfaces engage for the retraction of said bolt.

MAX E. DAYTON.